US006527082B1

(12) United States Patent
Taylor

(10) Patent No.: US 6,527,082 B1
(45) Date of Patent: *Mar. 4, 2003

(54) ATTACHMENT RING ASSEMBLY FOR A SAFETY HARNESS AND METHOD OF ATTACHING AN ATTACHMENT RING TO A SAFETY HARNESS

(75) Inventor: Robert A. Taylor, Oil City, PA (US)

(73) Assignee: Dalloz Fall Protection Investment, Inc., Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/788,210

(22) Filed: Jan. 27, 1997

(51) Int. Cl.[7] ............................ A47L 3/04; B64D 17/30

(52) U.S. Cl. ............................ 182/3; 182/5; 244/151 R

(58) Field of Search ............................... 182/3, 4, 5, 6, 182/7; 119/857; 224/255, 256, 257, 259; 244/151 R; 297/464, 465, 466, 467

(56) References Cited

U.S. PATENT DOCUMENTS 2,699,284 A * 1/1955 Rose ......................... 182/3 X
2,887,286 A * 5/1959 Moran ................ 244/151 R X
3,321,247 A * 5/1967 Dillender ................... 182/3 X
4,273,215 A * 6/1981 Leggett ......................... 182/3
4,553,633 A * 11/1985 Armstrong et al. ............ 182/3
4,938,436 A * 7/1990 Bradley et al. ......... 244/151 R
5,325,818 A * 7/1994 Leach ....................... 182/3 X
5,360,082 A * 11/1994 Bell .......................... 182/6 X
5,361,953 A * 11/1994 Nichols ...................... 224/198
5,544,363 A * 8/1996 McCue et al. .......... 297/465 X
5,628,548 A * 5/1997 Lacoste .................. 297/464 X
5,988,315 A * 11/1999 Crane ............................ 182/3

* cited by examiner

*Primary Examiner*—Daniel P. Stodola
*Assistant Examiner*—Hugh B. Thompson
(74) *Attorney, Agent, or Firm*—Bartony & Hare

(57) ABSTRACT

An attachment ring assembly comprises an attachment ring adapted to connect a safety harness to another object and a connecting member attached to the attachment ring. The connecting member is attached to the attachment ring to have a first end and a second end extending from the attachment ring. The attachment ring assembly further comprises a first attachment member attached to the first end of the connecting member. The first attachment member is adapted to be attachable to a first strap of the safety harness. The attachment ring assembly also comprises a second attachment member attached to the second end of the connecting member. The second attachment member is adapted to be attachable to a second strap of the safety harness. Preferably, the first attachment member and the second attachment member are adjustable in position after attachment to the first strap and the second strap, respectively.

5 Claims, 2 Drawing Sheets

ATTACHMENT RING ASSEMBLY FOR A SAFETY HARNESS AND METHOD OF ATTACHING AN ATTACHMENT RING TO A SAFETY HARNESS

FIELD OF THE INVENTION

The present invention relates to an attachment ring assembly and to a method of attachment of an attachment ring and, particularly, to an adjustable attachment ring assembly for a safety harness and to a method of attachment of an adjustable attachment ring to a safety harness.

BACKGROUND OF THE INVENTION

Safety harnesses are commonly used as part of a fall protection system for persons subjected to the potential of a fall from a height. In the workplace, full-body safety harnesses are generally used. Such harnesses, which typically include shoulder straps, can be designed in many alternative manners. See, for example, U.S. Pat. Nos. 5,531,292, 5,329,844, and 5,203,829.

Typically, safety harnesses include one or more attachment rings (often referred to as a D-rings) to which a positioning line or a lifeline may be attached to position or to secure, respectively, the user of the safety harness. In general, such attachment rings are attached to the safety harness at the same position on each harness at the time of manufacture. For different uses, however, it may be desirable to attach the attachment ring at a different position on the harness. This result is particularly desirable in the case of attachment rings to be used with positioning lines. The design and methods of attachment of current attachment rings, however, often make it difficult and/or expensive to manufacture safety harnesses in which one or more attachment rings are positioned on the safety harness for a particular purpose or use.

Moreover, attempts to manufacture safety harnesses in which the position of an attachment ring on the safety harness is adjustable after manufacture thereof have met with limited success. In a number of such safety harness, the shoulder straps of the harness are crossed through an integral loop or channel formed on the attachment ring to connect the attachment ring to the safety harness. An adjustable link or buckle may also be provided on the safety harness in the vicinity of the attachment ring. In general, such attachment rings are very difficult to adjust. Further, crossing or intersection of the shoulder straps leads to excessive pressure on the neck of the user and limited motion.

It is, therefore, very desirable to develop an attachment ring assembly and a method of attachment of an attachment ring with facilitates the positioning of the attachment ring at various positions on the safety harness.

SUMMARY OF THE INVENTION

In general, the present invention provides an attachment ring assembly for attachment to a safety harness. The safety harness comprises a first strap and a second strap. The attachment ring assembly comprises an attachment ring and a connecting member attached to the attachment ring. The connecting member is attached to the attachment ring to have a first end and a second end extending from the attachment ring. The attachment ring assembly further comprises a first attachment member attached to the first end of the connecting member. The first attachment member is adapted to be attachable to the first strap of the safety harness. The attachment ring assembly also comprises a second attachment member attached to the second end of the connecting member. The second attachment member is adapted to be attachable to the second strap of the safety harness. Preferably, the first attachment member and the second attachment member are adjustable in position after attachment to the first strap and the second strap of the safety harness, respectively. In this manner, the position of the attachment ring is made adjustable after attachment to the safety harness.

The attachment ring assembly also preferably comprises at least one cross member attached thereto. The cross member may be attached to the connecting member. The cross member preferably forms at least one loop to extend around at least one of the first strap and the second strap.

The present invention also provides a method of attaching an attachment ring to a safety harness. The safety harness comprises a first strap and a second strap. The method comprises the steps of:

a. attaching an attachment ring to a connecting member such that a first end of the connecting member and a second end of the connecting member extend from the attachment ring;
b. attaching a first attachment member to the first end of the connecting member;
c. attaching a second attachment member to the second end of the connecting member;
d. attaching the first attachment member to the first strap; and
e. attaching the second attachment member to the second strap.

As discussed above, the first and second attachment members are preferably adjustable to enable adjustment of the position of the attachment ring on the safety harness.

Preferably, the method of the present invention also comprises the steps of:

f. attaching a cross member to at least one of the first end and the second end of the connecting member, the cross member forming a loop to encompass the first strap and the second strap.

DETAILED DESCRIPTION OF THE INVENTION

Figure 1:
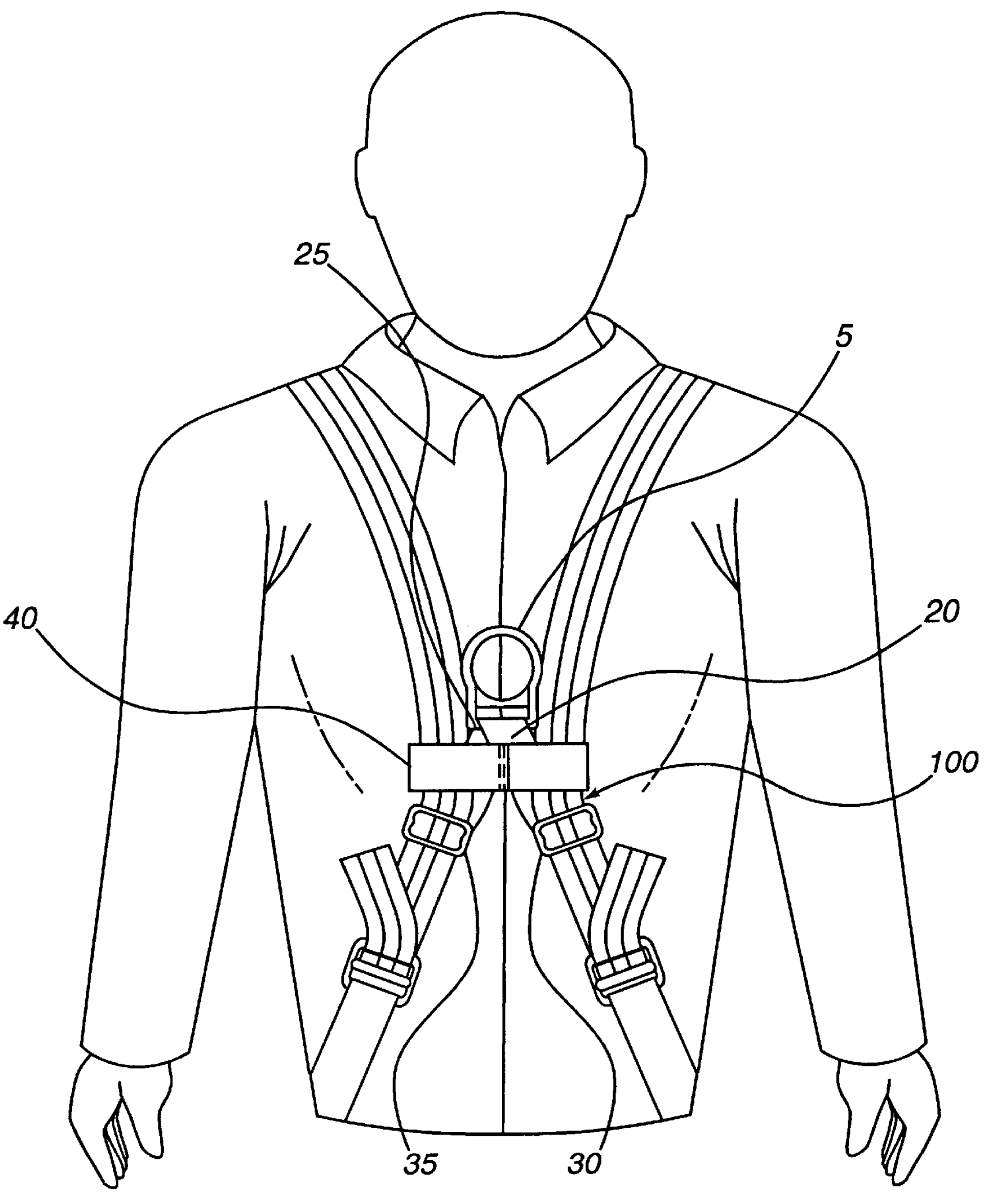
FIG. 1 illustrates a safety harness comprising one embodiment of an attachment ring assembly of the present invention.

Attachment ring or D-ring assembly 10 is attachable to a full body safety harness 100 as illustrated in FIG. 1. Although FIG. 1 provides one example of a full body safety harness, such harnesses can be designed in many alternative manners. The present invention is generally applicable to any safety harness design having two spaced straps (for example, shoulder straps which extend over the shoulders of the user). As used herein, the phrase "spaced straps" refers to straps that do not intersect in the vicinity of the attachment ring. Preferably, such straps extend generally parallel to each other.

Figure 2B:
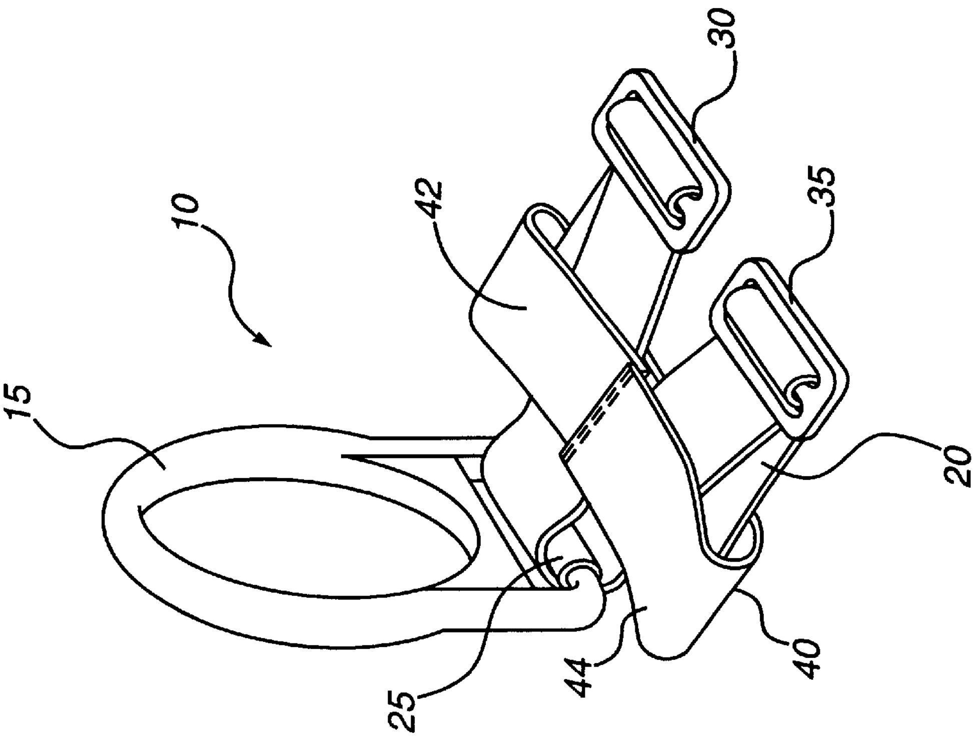
FIGS. 2A and 2B illustrate the assembly of the attachment ring assembly of FIG. 1.
Figure 2A:
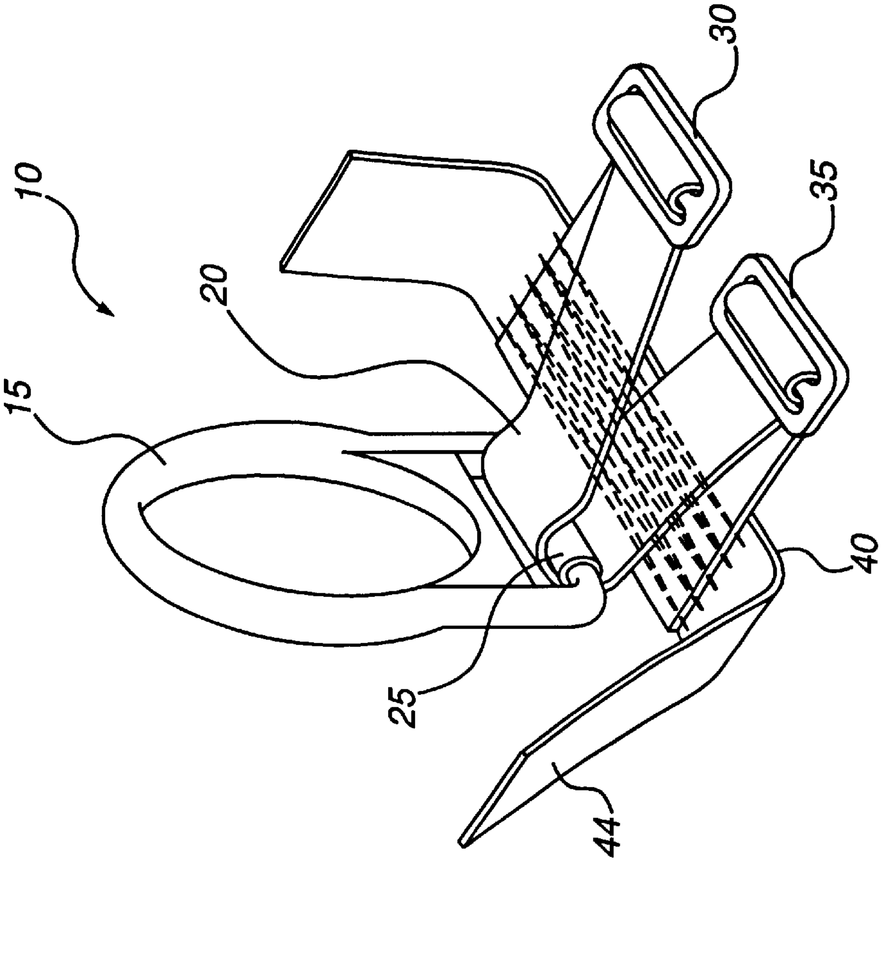

As best illustrated in FIGS. 2A and 2B, attachment ring assembly 10 comprises a attachment ring 15 suitable for connection to, for example, a lifeline or lanyard. Substantially any attachment ring as known in the art is suitable for use in the present invention. Attachment ring assembly 10 further comprises a connecting member 20 which is preferably fabricated from an integral length of a flexible, resilient material such as a webbing material as known in the harness arts. Such webbing materials are typically fabricated from flexible, resilient polymeric materials such as nylon. Connecting member 20 may, however, be fabricated from a rigid material. As clear to one skilled in the art, any material used for connecting member must have suitable strength to withstand the forces experienced during use of safety harness 100. Connecting member 20 may loop around an attachment bar 25 connected to attachment ring 15. Alternatively, connecting member 20 may pass directly through attachment ring 15. Moreover, connecting member 20 may comprises two separate (non-integral) extending members or ends, each of which is secured to attachment ring 15.

One extending end of connecting member 20 is connected to a first harness attachment member 30. The other extending end of connecting member 20 is preferably connected to a second harness attachment member 35. Preferably, first and second harness attachment members 30 and 35 comprise adjustable friction buckles as known in the art. Preferably, the extending ends of connecting member 20 are connected to first and second adjustable buckles 30 and 35 (or other attachment members) and are looped back to be attached to connecting member 20 (for example, via stitching) as illustrated in FIG. 2A to retain first and second buckles 30 and 35.

As illustrate in FIG. 1, the shoulder straps of safety harness 100 pass through buckles 30 and 35 to adjustably connect attachment ring assembly 10 to safety harness 100. In general, friction buckles 30 and 35 prevent undesirable repositioning of attachment ring assembly 10 during use of safety harness 100, but allow easy adjustment of the position of attachment ring assembly 10 when desired by the user.

Preferably, the safety harness straps to which attachment ring assembly 10 are attached are maintained in spaced relation to each other after attachment of attachment ring assembly 10. Preferably, the straps are maintained at least two inches apart in the vicinity of attachment ring assembly 10. Maintaining such spacing of the safety harness straps assists in preventing loss of mobility of the user and excessive discomfort of the user often associated with crossing of straps and, in particular, crossing of shoulder straps.

Preferably, attachment ring assembly 10 is further provided with at least one cross member or strap 40 which is preferably fabricated from webbing material as known in the harness arts. Cross member 40 may, however, be fabricated from a rigid material. As best illustrated in FIGS. 2A and 2B, connecting member 20 is preferably attached to cross strap 40 via stitching of at least one of the two ends of connecting member 20 to cross strap 40. Free ends 42 and 44 of cross strap 40 may be attached as illustrated in FIG. 2B to form a loop. Alternatively, free end 42 can be attached to cross strap 40 to form a. first loop through which one shoulder strap passes, and free end 44 can be attached to cross strap 40 to form a second loop through which the other shoulder strap passes. Upon connection of attachment ring assembly 10 to safety harness 100, the shoulder straps of safety harness 100 pass through the loop(s) formed by cross strap(s) or member (s) 40 and then through buckles 30 and 35. Cross strap 40 assists in ensuring a secure connection between attachment ring assembly 10 and safety harness 100 and provides one or more guide loops or channels for adjustable positioning of attachment ring assembly 10 on the straps of safety harness 100. As clear to one skilled in the art and as described above, the present invention is easily added to many existing designs of full body safety harnesses to place an adjustable attachment ring or D-ring at substantially any appropriate position on the safety harness.

Although the present invention has been described in detail in connection with the above examples, it is to be understood that such detail is solely for that purpose and that variations can be made by those skilled in the art without departing from the spirit of the invention except as it may be limited by the following claims.

What is claimed is:

1. A method of attaching an attachment ring to an otherwise complete safety harness for use by a person working at a height, the safety harness comprising a first strap and a second strap, the method comprising the steps of:

a. attaching an anchor attachment ring to a connecting member such that a first extending member of the connecting member and a second extending member of the connecting member extend from the anchor attachment ring, the anchor attachment ring adapted to connect the safety harness to an anchoring object to suspend the safety harness and the weight of the person, the anchor attachment ring being of sufficient strength to suspend the person in case of a fall;

b. attaching a first attachment member to the first extending member of the connecting member;

c. attaching a second attachment member to the second extending member of the connecting member;

d. attaching the first attachment member to the first strap;

e. attaching the second attachment member to the second strap, the first attachment member and the second attachment member being attached to the first strap and the second strap, respectively, such that the attachment ring extends from the safety harness and a spaced separation is maintained between the first strap and the second strap in the vicinity of the attachment ring; and f. attaching a cross member to the connecting member, the cross member forming at least one loop to encompass at least one of the first strap and the second strap.

2. The method of claim 1 wherein the first extending member of the connecting member comprises a flexible webbing material, the second extending member of the connecting member comprises a flexible webbing material and the cross member comprises a flexible webbing material.

3. The method of claim 1 wherein the first attachment member and the second attachment member are adapted to be adjustable in position after attachment to the first strap and the second strap, respectively.

4. The method of claim 3 wherein the first attachment member comprises a first adjustable friction buckle and the second attachment member comprises a second adjustable friction buckle.

5. The method of claim 3 wherein the first strap is a first shoulder strap and the second strap is a second shoulder strap.

* * * * *